United States Patent Office 3,142,638
Patented July 28, 1964

3,142,638
PROCESS FOR SEPARATING SOLIDS
FROM SEWAGE
Donald Stapf Blaisdell, 730 Summit Ave., St. Paul, Minn.,
and Ruth Elizabeth Barry Klaas, 3531 Ridgewood
Road, Arden Hills, Minn.
No Drawing. Filed June 29, 1962, Ser. No. 206,184
7 Claims. (Cl. 210—52)

This invention relates to the treatment of sewage, and this application is a continuation-in-part of application for U.S. Letters Patent Serial Numbers 724,785 (filed March 31, 1958, now abandoned) and 786,906 (filed January 15, 1959 now abandoned) by the present inventors. More specifically, this invention relates to novel compositions useful as additives for sewage, and to novel processes for the treatment of sewage.

It is an object of this invention to provide novel sewage compositions from which suspended solids settle and can be removed rapidly in treating mechanisms of simple design and modest size.

It is a principal object of this invention to provide a novel type of clarifying agent in the treatment of sewage, which type of clarifying agent causes rapid flocculation and sedimentation of solids, either suspended, dissolved, or both, in said sewage, and makes said solids adapted for easy and rapid removal from the major aqueous component of such sewage, at low cost in treating mechanisms of simple design and modest size.

It is a further principal object of this invention to provide novel processes for the treatment of sewage, wherein chemical additives may be employed to produce a treated water of relatively high degree of purity from aqueous liquors containing wastes, such as fecal matter or other contaminants, in treating mechanisms of simple design and modest size.

Another object is to provide a sewage sludge of relatively higher solids content, and of relatively lower volume per unit volume of sewage treated, than obtained in present chemical methods of treating sewage conventionally used.

Another object is to provide a sludge of modified characteristics (e.g. filtration, dispersion, digestion characteristics), as compared to the characteristics of sludges obtained in conventional chemical methods of treating sewage or such like liquors.

Still a further object is to provide waters of a relatively high degree of purity by chemical treatment of aqueous liquors containing such wastes as sanitary sewage, industrial wastes or other contaminants.

Various other objects, advantages, and features of this invention will become apparent to those skilled in the art upon reading the specification and appended claims. A broad field of utility for our invention is, of course, the treatment of municipal sewage.

Sewage ordinarily is a dilute aqueous mixture of the wastes from household and industry that is convenient and economical to carry away by water. As used in this specification and the appended claims, the term sewage refers to any of the ordinary types of aqueous liquors containing significant amounts of wastes, such as fecal matter, domestic wastes, industrial wastes, and such like, and is not to be construed as being limited to meaning only aqueous liquors which in lay terms are ordinarily called sewages, nor should it be construed as being limited to mean aqueous liquors which have actually been carried through pipe, conduit, or sewers. In some embodiments of our invention, the concentrations of wastes of significance to the application at hand may be only a few parts per million, and in other embodiments the concentrations may be as high as 10,000 parts per million or even higher. Unless otherwise defined in this specification, the definitions of the terms and tests we use are those set forth in the book, "Standard Methods for the Examination of Water, Sewage, and Industrial Wastes," Tenth Edition, published in 1955 by the American Public Health Association, of New York City, and such standard handbooks and textbooks of chemistry as: Lange, "Handbook of Chemistry," Handbook Publishers, Inc., Sandusky, Ohio, 1944; Latimer and Hildebrand, "Reference Book of Inorganic Chemistry," Revised Edition, The Macmillan Company, New York, 1940; Hildebrand, "Principles of Chemistry," Fifth Edition, The Macmillan Company, New York, 1947; Fuson and Snyder, "Organic Chemistry," John Wiley & Sons, Inc., New York, 1942; and Glasstone, "Textbook of Physical Chemistry," Second Edition, D. Van Nostrand Co., Inc., New York, 1946. Thus, for example, the term "water-dispersible synthetic organic cationic polyelectrolytic flocculating material" will be understood to exclude (as being polyampholytic rather than cationic) even polyacrylamide-type polymers that under some conditions may actually be anionic by reason of a minor content of carboxylic groups. (Compare Dow, "Separan 2610 In Waste and Sewage Treatment," October 1956, Dow Chemical Company, Midland, Michigan, and Chemical Week, September 17, 1960, page 6.) In other words, we regard an organic polyelectrolytic flocculating material as cationic only if the main bodies of the polymer molecules bear overall positive charges at pH levels commonly encountered in sewage; since the ionization constant of the amine groups is polyacrylamide is about $10^{-15}$, and the ionization constant of carboxylic groups is about $10^{-5}$, a modified polyacrylamide polymer containing even a very low percentage of carboxylic groups would be anionic at some levels of pH commonly encountered in sewage, or the like, and such modified polyacrylamide polymers are intended to be excluded specifically from the class of materials defined in this specification as "water dispersible synthetic organic cationic polyelectrolytic flocculating material."

Chemical treatment of sewage, of course, is well known to those versed in the prior art. The voluminous literature of this field mentions the use of the following materials, among others, in the treatment of sewage or raw water: ferric chloride, ferric sulfate, ferrous sulfate, chlorinated copperas, calcium oxide, calcium hydroxide, aluminum sulfate, alkali hypochlorites, soda ash, activated silica, calcium carbonte, coal, diatomite, activated carbon, ammonium sulfate, sodium aluminate, sodium silicofluoride, sodium flouride, caustic, sulfuric acid, activated glue, rosin size, pine oil, kerosense, copper sulfate, chloramine, sulfur dioxide, sodium sulfite, nitric acid, carbon dioxide, hydrochloric acid, oxygen, ozone, and chlorine.

In the prior art, iron and aluminum salts have been used as coagulants or flocculants for sewage, and indeed have a limited degree of effectiveness for removing colloidal solids and very finely divided suspended matter. Both the iron and aluminum salts sometimes used (ferric chloride, alum, and the like) have the property of forming relatively insoluble flocs that enmesh suspended material in the sewage, some of which material is swept out of the sewage as the floc matrix is removed. Iron and aluminum salts have been used also in the coagulation of sewage sludge, particularly in the preparation of the sludge for dewatering. (Our compositions are also useful in some degree for this purpose.)

Water-insoluble synthetic organic polyelectrolytes (ion exchange resins) have been used in the prior art in the conditioning of certain aqueous liquors, as described in the literature by one of us, and by many others in numerous references. The performance of carboxylic exchangers in the removal of material from certain types of aqueous liquors, for example, has been described by Kunin and Barry, in Industrial and Engineering Chemistry, 41, 1269–72 (1949); by Winters and Kunin, in Industrial and Engineering Chemistry, 41, 460 (1949); by McGarvey and Thompson, Industrial and Engineering Chemistry, 43, 741 (1951); and by others. Such water-insoluble ion exchangers have never found widespread commercial usage in the treatment of municipal sewage, by reason of their relative ineffectiveness especially in the light of their high initial and operating costs, and the general operational difficulties associated with the use of insoluble ion exchangers in aqueous liquors containing suspended solids.

In the separation of suspended inorganic solids from aqueous liquors, of course, certain chemical coagulants have been found to be effective at least to some degree. (See, for example, British Patent 760,869.)

To date, however, no really satisfactory chemical clarifying agent or chemical process for removing from aqueous liquors such as sewage, at acceptable costs and in treating mechanisms of simple design and modest size, suspended solids comprising substantial amounts of organic material has yet been developed. Even in the chemical coagulation of organic solids in raw water supplies, wherein the content of suspended or dissolved organic solids is generally only a few parts per million, acceptable results have been obtained only by using relatively large and expensive treating equipment, and excessively large amounts of chemical coagulant per unit amount of organic solids removed. (See, "Betz Handbook of Industrial Water Conditioning," W. H. and L. D. Betz, Philadelphia, 1950, especially pages 7 to 11, and compare with the later edition, "Betz Handbook of Industrial Water Conditioning," Betz Laboratories, Inc. (1957), pages 10 to 12; see also Hirsch, "Manual for Water Plant Operators," First Edition, Chemical Publishing Co., Inc., 1945, especially pages 56 to 76; Powell, Industrial and Engineering Chemistry, 46, No. 11, November 1954, pages 85A, 86A and 88A; and many other references.) Attempts to use organic flocculants without employing weighting agents in the manner herein disclosed have not met with any substantial commercial success in treating such aqueous liquors as sanitary or municipal sewage, principally because the specific polymers involved have been relatively ineffective or entirely too costly to justify use on an economic basis. (See Schiller and Suen, Industrial and Engineering Chemistry, 48, 2132–2137 (1957); Hiroshi Nakamura, "High Speed Chemical Treatment of Excreta," from the 1957 Series of Sewage Treatment, No. 1, Japan Nutrition Association, 4, 2, Yurakuchio, Chiyodaku, Tokyo, Japan (1957) Clemens, U.S. Patent 2,862,880 (issued December 2, 1958); Paschall, U.S. Patent 2,876,217 (issued March 3, 1959); Gloor, U.S. Patent 2,728,724 and U.S. Patent 2,728,725 (both issued December 27, 1955); Goren, U.S. Patent 2,937,143 (issued May 17, 1960); Dunlap, Australian Patent 216,301 (September 20, 1956); Dow, French Patent 1,168,036 (December 3, 1958); British Patent 773,716 (May 1, 1957); Caldwell, Wurzburg, and Sun, U.S. Patent 2,975,124 (issued March 14, 1961); Hullinger and Yui, U.S. Patent 2,970,140 (issued January 31, 1961); Stephens and Raroport, U.S. Patent 2,938,026 (issued May 24, 1960); Schifferli, U.S. Patent 2,957,821 (issued October 25, 1960); Chemical Week, 87 (August 6, 1960), pages 26–28; Chemical Week, 87, (September 17, 1960), page 16; Plant Management and Engineering, 23, (March 1961), pages 2 and 3; Aimone and Booth, U.S. Patent 2,740,522 (issued April 3, 1956); Contois, U.S. Patent 2,847,403 (issued August 12, 1958); Chemical Engineering, June 1956, page 148; Dow, "Separan 2610 In Waste and Sewage Treatment," (October 1956), Dow Chemical Co., Midland, Michigan; "Coagulant Aids," Bulletin 410–12–2 (1957), Hagan Chemicals & Controls, Inc., Pittsburgh, Pennsylvania; "Hagan Coagulant Aids Nos. 7, 11, and 18 Safe for Drinking Waters," Hagan Bulletin 4104–1–12#HC–5652, Hagan Chemicals & Controls, Inc., Pittsburgh, Pennsylvania; French Patent 1,123,970 (October 2, 1956); Australian Patent 200,883 (April 21, 1955); Uytenbogaart, U.S. Patent 2,236,930 (issued April 1, 1941); Ralston and Pool, U.S. Patent 2,315,734 (issued April 6, 1943); Wilson, U.S. Patent 2,419,930 (issued April 29, 1947); McDonald, U.S. Patent 2,647,084 (issued July 28, 1953); Stautzenberger and MacLean, U.S. Patent 2,903,438 (issued September 8, 1959); Suen and Schiller, Canadian Patent 589,309 (issued December 22, 1959); Weidner and Dunlap, U.S. Patent 2,995,512 (issued August 8, 1961); British Patent 10,050 (October 30, 1906); and multitudinous other references.) Even relatively cheap anionic organic polyelectrolytic coagulants diluted with massive amounts of inexpensive anionic polyelectrolytic flocculant aid such as clay (see Henry, U.S. Patent 2,296,-523, issued September 22, 1942, and Ryznar, U.S. Patent 2,420,340, issued May 13, 1947) have proved too expensive for general use in the chemical treatment of municipal sewage, although such clay/anionic organic polyelectrolyte combinations have found some acceptance in the treatment of raw water supplies having relatively low concentrations of suspended and/or dissolved organic solids. (See "Coagulant Aid Simplifies Water Clarification," Chemical Engineering, page 148 (June 1956).)

As noted below, our invention involves flocculation and clarification of sewage by additives and methods involving a type of cationic organic polymer, as herein specified, and a weighting agent. The relative efficiency of cationic polymers in flocculating sewage, of course, is not surprising, in view of references of the prior art cited above. The efficiency of a weighting agent along with the cationic polymer is really most surprising, since all of the prior art of which we are aware tends to indicate that weighting agents are relatively inefficient, and simply are not economic in any significant proportion of sewage treating problems. (See especially Gehm, Sewage Works Journal, 13, 681–689 (1941).) Anionic organic polymer/weighting agent combinations were used for clarifying and purifying liquids and waste waters by Ravenstad (U.S. Patent 1,619,036, issued March 1, 1927) over thirty-five years ago, but never have come into substantial use, even though iron ore and a magnetic method of sedimentation were later suggested (Urbain and Stemen, U.S. Patent 2,232,294, issued February 18, 1941).

The essence of our invention lies in the interaction of cationic polymers, of the type specified herein, and weighting agent, of the type herein specified, in the treatment of aqueous liquor. Although it is true that instances of coaction between metal materials (as free metal, ion, or compound) and organic polymers, due apparently to the formation of "partially covalent" or "coordinate covalent" bonds between the metal material and organic polymer (Kunin and Barry, Industrial and Engineering Chemistry, 41, 1269 (1949), and Dow, British Patent 760,869, published November 7, 1956) have been long known, no one has ever, to the best of our knowledge, taken advantage of this type of coaction to produce a synergistic effect in the treatment of sewage.

The extent of the coaction of our cationic polymers and weighting agents in the treatment of sewage—that is, the extent of the synergistic effect obtained—is far greater than the sum of the effects which might reasonably be expected by consideration of the individual components thereof. Thus, the synergism obtained in the practice of our invention is so marked (as the examples below make clear) that our additives are normally employed in the treatment of sanitary sewage at a concentration of only about one-hundredth that of the suspended solids in the sewage; to appreciate the significance of this fact in an operation where economics is a paramount consideration, compare Buswell's statement that . . . "the required dosage of chemical coagulant runs about one pound per pound of impurities removed . . . " (Buswell, "Encyclopedia of Chemical Technology," The Interscience Encyclopedia, Inc., New York, 1954, Volume 12, in the paragraphs of pages 200–201).

The major disadvantages of chemical treatment of sewage, as ordinarily practiced in the prior art, are chiefly: (1) slowness of removal of coagulant flocs from the treated sewage, with consequent need for costly treating and settling tanks of large size; (2) inefficiency in removal of very finely divided suspended and in particular the coagulable or absorbable dissolved solids; (3) relatively low purity of treated water obtained from the sewage-treatment process, and (4) relatively high volume of sludge produced per unit volume of sewage treated. These major disadvantages of the conventional chemical methods of treating sewage have prevented the widespread commercial use of such methods on any but extremely dilute sewages, despite the fact that chemical treatment of sewage offers the possibility of very large savings of capital costs in the construction of sewage treatment plants in return for a very small (by comparison) daily outlay for the costs of the necessary treating chemicals. As Buswell, "Encyclopedia of Chemical Technology," The Interscience Encyclopedia, Inc., New York, 1954, Volume 12, pages 200–201, has pointed out, an enormous amount of work covering practically every known mechanical or chemical coagulant has been done on this problem, and yet the cost of chemicals is still usually too high to make the process attractive: normally, the required dosage of chemical coagulant runs about one pound per pound of impurities removed, the volume of sludge obtained is practically double that obtained by other process, the purification obtained seldom exceeds 60 percent, and tank capacity required is only slightly less than that normal for other processes. In consequence, chemical coagulants bear a major portion of the sewage-treating function in only a relatively small proportion of sewage-treating plants in the United States, although some chemical treatment is practiced, at least occasionally, in scores of plants. (See Babbitt and Bauman, "Sewerage and Sewage Treatment," Eighth Edition, John Wiley and Sons, Inc., New York, 1958, especially pages 443 to 446; see also Imhoff and Fair, "Sewage Treatment," Second edition, John Wiley and Sons, Inc., New York, 1956, especially pages 78 to 89.)

Our invention, as described and disclosed herein, provides means for overcoming these major disadvantages of the methods of chemical treatment as practiced in the prior art, and makes chemical treatment suitable and economic for treatment of municipal sewages, effluents from septic tank, cess pools, and the like from individual waste sources, industrial wastes, raw water supplies, and the like.

We have found that the addition of water-dispersible (especially hydrophilic) synthetic organic cationic polyelectrolytic flocculating material having a molecular weight in excess of 10,000 and at least one amine group per 10,000 units of molecular weight, at concentrations of 1 to 300 parts per million parts of sewage, along with iron ore weighting agent having a particle size smaller than 50 mesh (U.S. Standard Screens) flocculates and causes the suspended solids of the sewage to settle out most efficiently. In this manner, the disadvantages of conventional chemical methods of clarifying aqueous liquors, as set forth above, may be substantially overcome, and the objects of this invention, also as set forth above, and other objects, are attained. Especially good results are obtained if the water-dispersible synthetic organic cationic polyelectrolytic flocculating material and iron ore are used in combination with about 1 to about 300 parts by weight of water-dispersible inorganic cationic polyelectrolytic flocculant aid (such as ferric hydroxide in a sol formed by reaction of ferric chloride with a large excess of water and/or aluminum hydroxide in a sol formed by the reaction of sewage-grade alum with a large excess of water) per million parts of sewage.

(Water-dispersible inorganic polyelectrolytic flocculant aids useful in the practice of this invention include finely ground montmorillonites, attapulgite, Wyoming-type bentonite, calcium bentonite, bentones (amine derivatives of bentonite), bauxite, and the like. In this disclosure, of course, crystals or the like of inorganic polyelectrolytic material which tend, in suspension, to carry an overall negative charge (for example, Wyoming-type bentonite) are regarded as inorganic anionic polyelectrolytic flocculant aids, and crystals or the like of inorganic polyelectrolytic material which tend, in suspension, to carry an overall positive charge (for example, $Fe_2O_3 \cdot xH_2O$ or $Fe(OH)_3$) are regarded as inorganic cationic polyelectrolytic flocculating aids. Inorganic polyelectrolytes as described in this specification have, in general, average molecular weights in excess of about 10,000. By the term "water-dispersible" material, of course, as used in this specification and the appended claims, we mean to include water-soluble materials, as well as more or less solid materials of such fine particle size that, on agitation in water, they settle out of the liquid suspension only slowly and over an appreciable period of time.)

The iron ore weighting agent having a particle size less than 50 mesh (U.S. Standard Screens), generally speaking, of an average particle size in the range of 50 mesh to 200 mesh (U.S. Standard Screens) has been found to coact in synergistic fashion to a most remarkable extent with the water-dispersible synthetic organic cationic polyelectrolytic flocculating material.

The type of process applicable to insure rapid removal of flocs—gravity, magnetic field, electrostatic field, centrifugation, or such like—will in each case of course be determined chiefly by the properties of the specific weighting agent and/or organic polyelectrolytic flocculant employed, and generally to a lesser degree by the nature of the suspended solids in the sewage. Weighting material should be of fairly large particle size—e.g. in the range of 50 to 100 mesh (U.S. Standard Screens) when gravity only is used for sedimentation, but may be of much smaller particle size when magnetic, filtration, centrifugal, or such like method of separation is employed. Additionally there may also be added to the sewage along with the other classes of treating materials described above essentially non-ionic absorbents having high surface area per unit volume—such as activated carbon. The classes of treating materials may be combined in various ways, as will be described further herein, to make compositions of matter useful as additives for sewage, industrial wastes, raw water, and the like, especially if there is added separately to the sewage or raw water, in addition to the composition comprising water-dispersible synthetic organic cationic polyelectrolytic flocculating material and iron ore, flocculating material of an electrical charge opposite to that of the water-dispersible synthetic organic polyelectrolyte employed.

We have discovered that the most generally applicable additives for sewage, in the practice of our invention, contain from about 1 to about 100 parts of synthetic organic cationic polyelectrolytic flocculating material and from about 1 to about 100 parts by weight of weighting material and also may contain from about 1 to about 100 parts of inorganic polyelectrolytic flocculant aid and/or from about 1 to about 100 parts by weight of substantially non-ionic absorbent material.

For economic as well as technical reasons, iron ore has been found to be outstanding as a weighting agent. In some cases—especially those in which catalytic effects are desired from the presence of the weighting agent, as in oxidation of the sewage/sewage additive composition by blowing air through same or the clarified liquor obtained therefrom—other weighting agents, generally selected from the substantially water-insoluble compounds (preferably oxides in the case of metals where the oxide employed can be selected to be substantially water-insoluble and non-reactive with water) of metals which form coordinate covalent bonds with amines (e.g., mercury, copper, platinum, cobalt, nickel, silver, thallium) or with ammonia (e.g., cobalt, chromium, platinum, copper, silver, zinc, rhodium, mercury, nickel, gold, osmium, aluminum, thallium) may be admixed with the iron ore in such fashion as to form weighting agent, or in some cases may be used alone or in combination with each other as weighting agents. In general, therefore, weighting agents useful in the practice of this invention are finely ground solids, substantially insoluble in water, having little or no tendency to degrade spontaneously in particle size to particles of colloidal dimensions on standing in water, and having a specific gravity substantially in excess of 1, and preferably above 3. We have found such materials as iron-containing barite, magnetite, hematite, franklinite, iron-containing zirconia, and ilmenite, of an average particle size in the range of 50 mesh to 200 mesh (U.S. Standard Screens) particularly effective. Water-sensitive iron ore materials such as even those clays which contain enough iron to have a yellow or reddish color, which tend to form colloidal stable suspensions in water, are specifically excluded. Likewise it frequently may be desirable to include in the sol of water-dispersible inorganic cationic flocculant aid generally, of ferric hydroxide or aluminum hydroxide (see Bayles and Mills, "Basic Chemistry for High Schools," The Macmillan Co., New York, 1947, page 131; Latimer and Hildebrand, "Reference Book of Inorganic Chemistry," Revised Edition, The Macmillan Co., New York, 1940, page 393; Hildebrand, "Principles of Chemistry," Fifth Edition, The Macmillan Co., New York, 1947, pages 355 to 373; McCutcheon, Seltz and Warner, "General Chemistry," D. Van Nostrand Co., Inc., New York, 1939, page 335; Rollinson, "Olation and Related Chemical Processes" in "The Chemistry of the Coordination Compounds," as edited by Bailar, Reinhold Publishing Corp., New York, 1956, pages 448 to 471)—if such is used—at least some ions of metals selected from the group consisting of cobalt, chromium, platinum, copper, silver, zinc, rhodium, mercury, nickel, gold, osmium, aluminum and thallium. The type of metal(s) and/or metal compound(s) most useful for catalytic purposes in the oxidation of sewage of course varies with the type of solids in the sewage, but almost invariably will be selected from the group consisting of iron, cobalt, manganese, osmium, silver, copper, tin, vanadium, cerium, titanium, platinum, nickel, uranium, chromium, mercury, molybdenum, aluminum, tungsten, selenium, palladium, and lead—but perhaps most frequently copper or cobalt or both will be selected; in instances where it is impractical to include the catalytically active metal(s), metal compound(s) or both in the weighting agent or water-dispersible inorganic cationic flocculant aid or both, it will usually be possible to include such catalytically active material as a component of the sewage-treating equipment—for example, as a metal mesh screen or as a metal or metal oxide-bead bed in the air oxidation chamber of the sewage-treating equipment. As noted above, we have found compounds of copper and cobalt especially useful oxidation catalysts in the aeration of sewage; copper itself, in the form of metal mesh screening, also serves well as a catalyst in air oxidation procedures. (See "The Chemistry of the Coordination Compounds," edited by J. C. Bailar, Jr., New York, Reinhold Publishing Corp., 1956, especially front inside cover, front cover page, pages 1 through 99 and 416 through 471; also, Hildebrand, "Principles of Chemistry," Fifth Edition, New York, The Macmillan Co., 1947, pages 82 through 104 and 146 through 152, and Latimer and Hildebrand, "Reference Book of Inorganic Chemistry," Revised Edition, New York, The Macmillan Company, 1940, especially pages 98 to 100.)

Substantially non-ionic absorbent material of fine particle size (generally speaking in the range of 50 to 200 mesh, U.S. Standard Screens) and having a surface area of at least 10 square meters per gram of material may be used in combination with synthetic organic polyelectrolytic flocculating material and weighting materials and (optionally) also polyelectrolytic flocculant aids in the compositions of matter and processes described herein. In applications of this kind, we have found various grades of activated charcoal and like materials effective.

Water-dispersible synthetic organic cationic polyelectrolytic flocculating materials most useful in the practice of this invention include water-dispersible types containing primary amine, secondary amine, tertiary amine, quaternary amine groups, or combinations thereof. Generally speaking, the most effective types of polyelectrolytes have average molecular weights in excess of about 10,000. We have found water-dispersible polymerized ethylene imine and derivatives thereof obtained by reacting said polymerized ethylene imine with aqueous hydrochloric acid and with various amounts of ethyl bromide or aqueous ethyl alcohol and like derivatives to be especially effective in the treatment of sewage and the like. In addition, we have found that water-dispersible melamine-formaldehyde resins, ureaformaldehyde resins, and the like, and compositions obtained by heating said resins with various amounts of an amine such as pyridine, in hot aqueous hydrochloric acid, and like derivatives, are also useful to attain at least to some degree the objects of this invention. (The melamine-formaldehyde resins employed were commercial wet-strength paper-treating resins. Methods of making such resins, generally by condensing melamine with aqueous formaldehyde in a melamine: formaldehyde ratio of 1:2 to 1:4 at 60° C. to 90° C. and preferably under slightly alkaline conditions, as in the range of pH 8 to pH 9, are well known and are described in the prior art.) Although all of the cationic synthetic organic polyelectrolytes described herein are in themselves effective to a small extent for attaining at least some of the objects of this invention, we have found, as noted above, that far better results may be achieved, at far lower cost per volume of sewage treated, by using along with the water-dispersible synthetic organic cationic polyelectrolytic flocculating material, weighting material and preferably also cationic inorganic polyelectrolytic flocculant aid and (optionally) substantially non-ionic absorbent material, all of these latter classes being of the types used in the compositions and processes specified elsewhere herein.

For best results, we have found that the water-dispersible synthetic organic cationic polyelectrolytic flocculating material used in our compositions and processes should have at least one amine group per 10,000 units of molecular weight. Especially good results are obtained when the amine employed is primary or secondary, rather than tertiary, quaternary or "hybrid" amine-containing group, and when the molecular structure of the organic cationic flocculating material contains an amine group removed two or three carbon atoms along the skeletal structure of the polymer from a substituent amine or hydroxyl group—that is, when the polymer contains groupings such as $$\leftarrow \underset{X}{\overset{R}{\underset{|}{C}}} - \underset{}{\overset{|}{C}} \rightarrow \quad \text{or} \quad \leftarrow \underset{X}{\overset{R}{\underset{|}{C}}} - \underset{}{\overset{|}{C}} - \underset{}{\overset{|}{C}} \rightarrow$$

wherein "R" is a hydroxyl or amine group and "X" is an amine group. Thus, cationic starch of the type designated herein has been found to be, under conditions also as specified herein, extraordinarily efficient, in combination with iron ore weighting agent. (In this type of chemical structure, the amine group is normally two carbons removed along the skeletal structure of the polymer from a substituent hydroxyl group:

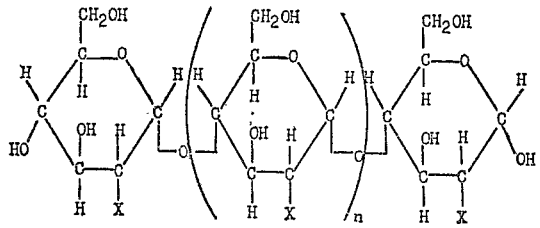

Where $X$=amine (e.g., aminoalkoxy)-group (In the end group of the polymer chain in a structure of this type, the amine group may be three carbons removed from a hydroxyl group.) Other materials of this same general type of chemical structure, such as the so-called "cationic modified celluloses" are also effective. It should be noted that cationic polymers having a skeletal chain structure that is resistant to degradation by heat, hydrolysis, bacterial attack, or the like offer substantial advantages in the practice of our invention particularly in instances where it is desired to recycle the treating chemical, as (1) by treating the raw sewage with cationic polymer and weighting agent, (2) settling the flocculated solids containing most of the sewage solids, the cationic polymer, and the weighting agent, (3) degrading the sewage solids, but not the cationic polymer or the weighting agent (to any really significant extent), by hydrolysis, oxidation, heat, bacterial attack, or the like in a vessel preferably separate from the settling/sedimentation vessel, and (4) recycling the undegraded polymer and weighting agent from the degradation phase along with make-up chemicals, back into the main settling/sedimentation vessel. (This general type of recycling process is also applicable in the use of weighting agents with anionic and/or certain non-ionic polymers having molecular weights in excess of 10,000 and resistance to hydrolysis, oxidation, heat, bacterial attack, or the like.)

Generally speaking, the polymers of utility in the practice of our invention are hydrophilic—that is, they tend to be quite readily "soluble" in water at the concentrations of use, and have at least one oxygen or nitrogen atom for every ten carbon atoms (and usually for every one or two carbon atoms) in the molecular structure of the polymer.

As noted above, cationic starch is especially useful in the practice of our invention, although other cationic polymers may be used. Thus, the disadvantages of conventional chemical methods of clarifying aqueous liquors, as set forth above, may be substantially overcome, and the objects of this invention, also as set forth above, and other objects, are attained by employing as a clarifying agent for sewage a composition of matter comprising water-dispersible cationic starch having an average molecular weight of about 1,000,000, and iron ore having a particle size smaller than 50 mesh (U.S. Standard Screens), said cationic starch and said iron ore weighting agent being employed in amounts sufficient to cause flocculation and accelerated sedimentation of solids in said sewage, and thereafter separating from the sewage an aqueous portion substantially free of suspended solids. In the treatment of many classes of sewage, even more outstanding results may be obtained in overcoming the disadvantages of conventional chemical methods of clarifying sewage, and in attaining the objects of this invention, as set forth above, and other objects, by employing a method of clarifying aqueous liquor, which comprises mixing with said liquor separately (a) water-dispersible cationic starch having an average molecular weight of about 1,000,000, and iron ore weighting agent having a particle size smaller than 50 mesh (U.S. Standard Screens), and (b) anionic flocculating material, said cationic starch, said iron ore weighting agent, and said anionic flocculating material being employed in amounts sufficient to cause flocculation and accelerated sedimentation of solids in said sewage, and thereafter separating from the sewage compositions formed an aqueous portion substantially free of suspended solids.

In the practice of our invention, as described and disclosed herein, we have found that water-dispersible cationic starches having average molecular weights of 1,000,000 give excellent results, although some degree of effectiveness has been demonstrated in the use of cationic starches having molecular weights as low as about 10,000, and also in the range of molecular weights (as in slightly cross-linked starches) above 1,000,000 and indeed on the order of several million. Accordingly, our specification of molecular weight in the phrase "cationic starch having an average molecular weight of about 1,000,000" is intended to be an "order-of-magnitude" term only—that is, we mean to have it understood by the term "molecular weight of about 1,000,000" the whole range of molecular weights from somewhat above 10,000 to perhaps above 10,000,000, or as high a molecular weight as the cationic starch retains the property of dispersibility in water. We have also found that cationic starches, to be well adapted for use in this invention, should have at least one basic (normally, amine) group for every 40 to 50 anhydroglucose units (equivalent to about 10,000 units of molecular weight, in the starch molecule, and that the ionization constant of the basic groups employed should be larger than $10^{-11}$ and preferably on the order of $10^{-5}$ or even higher. It is thought that this requirement of substantial basic strength may be due to the weakly acidic character of the hydroxyl groups in the starch, which, together with, for example, very weakly basic groups such as amide groups having ionization constant on the order of $10^{-15}$, might tend to confer undesirable polyampholytic character on the starch to such an undesirable degree that the starch might exhibit an isoelectric point at or near the pH of the aqueous liquor being treated, with consequent effect in the practice of our invention. Starches containing sufficient amine groups such as the p-aminobenzyl, amino, and dimethylamino groups have given good results, in combination with ferruginous material (including iron ore), and so forth, in the clarification of aqueous liquors. Such cationic starches may be made in a great number of different ways, as will be evident to those versed in the art of organic chemistry and particularly in the art of starch chemistry, as by amination and/or other appropriate treatment (e.g., reduction, where applicable) of selected starch derivatives as described in Kerr, "Chemistry and Industry of Starch," Second Edition, Academic Press, Inc., New York, 1950 (Chapter X, by E. F. Degering, Derivatives of Starch, pages 259 to 323; chapter XI, by J. M. Newton and G. T. Peckham, Jr., Oxidation of Starch, pages 325 to 343); Bruson, U.S. Patent 2,401,607; J. H. van der Meulen, German Patent 624,988 and U.S. Patent 2,053,012; Dreyfus, British Patent 166,767; Lolkema and Moller, Netherland Patent 56,340; Thomson, "The Direct Chlorination of Starch," Thesis, Kansas State College (1945); Gaver, U.S. Patent 2,518,135; Konigsberg, U.S. Patent 2,500,950; and diverse other publications. For the purpose of illustrating a method of preparing cationic starch, we have included among our examples in this disclosure a detailed description of the process whereby we have made in good yield cationic starch having a substantial content of p-aminobenzyl groups.

The ferruginous material we have used in the practice of our invention has been, of course, iron ore, in most instances along with ferric chloride. Other iron compounds may be used, but we have found the best results are obtained where the ferruginous material is of such a nature that it produces ferrous hydroxide and/or ferric hydroxide on reaction with water, and further when any fraction of the ferruginous material which remains a hard, substantially water-insoluble solid on dispersion in water has a particle size such that substantially all of said fraction passes 50 mesh U.S. Standard Screens.

Water-dispersible negatively charged flocculating agents (that is, anionic flocculating material) useful in the practice of this invention have been, for the most part, anionic polyelectrolytes having molecular weights in excess of about 10,000, of sufficient ionization strength (or containing phenolic, carboxylic, sulfonic, or phosphorous-containing acidic groups) to form salts with alkali cations to a substantial extent in water dispersion at pH values below 12, and certain compositions of matter comprising such anionic polyelectrolytes. Thus, we have found the following compositions of matter, among others, useful as water-dispersible negatively charged flocculating agents in the practice of our invention: commercial waterproof phenolic glue obtained by methods well known and described in the prior art, and comprising generally the heating of phenol, resorcinol, and aqueous formaldehyde, at a phenol-resorcinol:formaldehyde ratio greater than 1:1 under acidic conditions for several hours; the sodium salt of hydrolyzed polyacrylonitrile having an average molecular weight of about 200,000, and nitrogen content below about 6 percent by weight; sodium polyacrylate having an average molecular weight of about 300,000; synthetic anionic polymers containing carbohydrate residues such as a commercial grade of sodium carboxymethylcellulose having a degree of substitution of about 0.80 sodium carboxymethyl group per anhydroglucose unit, and an average molecular weight of about 50,000, or the sodium salt of an acid-ester of starch having a molecular weight of about 100,000, and prepared by acetylation and sulfonation of starch, according to procedures adapted from Caldwell in Britsh Patent 688,291, from Carolles and Blondeau, in Rev. Sci., Ind. Paris, 15, 69 (1843), and from Tamba in Biochem. Z., 141, 274 (1923), in the light of the information presented in Kerr, "Chemistry and Industry of Starch," Second Edition, Academic Press, Inc., New York, 1950 (Chapter X, by E. F. Degering, Derivatives of Starch, pages 259 to 323) and in the "Encyclopedia of Chemical Technology," The Interscience Encyclopedia, Inc., New York, 1954 (Volume 12, pages 774 and 775; the sodium salt of the copolymer formed by the reaction of equimolar amounts of styrene and maleic anhydride under conditions generally similar to those described in United States Patent 2,333,513, said copolymer having an average molecular weight of about 100,000; the sodium salt of a sulfonated polystyrene having a degree of substitution of approximately one sulfonate group per styrene nucleus, having an average molecular weight of about 10,000, and prepared according to the general methods set forth in United States Patent 2,533,210 or United States Patent 2,533,211; the sodium salt of a sulfonated polystyrene having a degree of substitution of approximately one sulfonate group per styrene nucleus, having an average molecular weight of about 70,000, and prepared according to the general methods set forth in United States Patent 2,533,210 or United States Patent 2,533,211; the product obtained by reacting phosphoric acid and polyvinyl alcohol together and subsequently neutralizing with cold aqueous sodium hydroxide; phosphorylated starches obtained by treating corn starch with phosphorus oxychloride in pyridine, by a procedure adapted from Samec, "Kolloidchemie der Starke," Steinkopff, Leipzig, 1927, said phosphorylated starches having particular advantages in sewage-treating processes wherein air is blown through the sewage (See Green, "Biological Oxidation," Scientific American, 199, 56–62 (July 1958)); Wyoming-type bentonite as it naturally occurs in substantially the sodium form near Belle Fourche, South Dakota; the hydrogen form of Wyoming-type bentonite, as obtained on treatment of Belle Fourche bentonite with hydrochloric acid and subsequent washing with water; the product obtained by heating corn starch with phosphoric acid; exocellular polysaccharide having a molecular weight of several millions, and having as a repeating unit 5 anhydromannose units one of which carries a monopotassium orthophosphate group attached at the C6 position, said exocellular polysaccharide being formed by fermentation of glucose with the yeast *Hansenula holstii* NRRL Y-2448 (Bulletin CA–N–7, "Information on Phosphomannan Y–2448," United States Department of Agriculture, Agricultural Research Service, Northern Utilization Research and Development Division, Peroia, Illinois, October, 1958); and other like polymers; and various combinations of the aforesaid polymers (including such inorganic polymers as the Wyoming-type bentonite listed) each polyelectrolyte by itself or in combination with one or more of the others and/or weight agents such as barium sulfate and/or essentially non-ionic absorbents having high surface area per unit volume, such as activated carbon and/or handling aids such as a finely ground synthetic calcium silicate having a $CaO/SiO_2$ ratio of 25.3/51.7. Exceptionally good results are obtained through the use of resins containing carboxylic groups, as in the case of those compositions of matter comprising the sodium salt of the copolymer of styrene and maleic anhydride specified above; however, it should be noted that this invention deals with the removal chiefly of water-insoluble materials of high molecular weight by treatment with compositions of matter comprising water-dispersible resins in some cases containing carboxylic groups), in distinct contrast to the earlier work co-authored by one of us wherein is described, for the most part, the removal chiefly of water-soluble materials of low molecular weight by treatment with substantially water-insoluble resinous beads containing carboxylic groups (Robert Kunin and Ruth E. Barry, "Equilibrium and Column Behavior of Exchange Resins—Carboxylic, Weak Acid Types, Cation Exchange Resins," Industrial and Engineering Chemistry, 41, 1269–72 (1949)).

In any consideration of the following examples, it should of course be kept in mind, as will be obvious to those skilled in the art, that the optimum dosage of chemical coagulants for any particular sewage to be treated is distinctly an individual problem, and can be best determined only by actual tests (Babbitt and Baumann, "Sewerage and Sewage Treatment," Eighth Edition, John Wiley and Sons, Inc., New York, 1958, page 449; Water Works and Sewerage, 81, 358 (1938)). However, we have generally found the optimum concentrations of each of the chemical classes used in our invention—viz., cationic polymer of the type herein described, iron ore weighting agent, and (optionally) negatively charged flocculating agent—lie in the range of from about 1 to about 300 parts of chemical per million parts of aqueous liquid to be treated, and quite generally in the range substantially below about 10 parts of chemical per million parts of aqueous liquor to be treated; that is, in specifying chemical dosages, the numbers we actually give can be only approximate, and, as it were, "order-of-magnitude" terms.

Furthermore, in any consideration of the following examples, it should be kept in mind that the actual processes of treating and separating aqueous liquors in accordance with our invention may involve modifications—such as, for example, the use of magnetic fields, centrifugation, electrostatic fields, or the like, in addition to, or instead of, gravity to accomplish rapid separation ("sedimentation") of flocculated material—without departing from the intended scope of our invention. In addition, it should be kept in mind that greatly superior results to these reported here may be expected in plant-scale practice of our invention, particularly in embodiments employing in modified form such processes as the Guggenheim method (Sewage Works Journal, 104 (January 1942); ibid., 973 (September 1944), or the Putnam method (Babbitt and Baumann, "Sewerage and Sewage Treatment," Eighth Edition, John Wiley and Sons, Inc., New York, 1958, page 457) or modifications thereof. Finally, it should be noted that optimum results, from both technical and economic standpoints, are achieved in the practice of this invention in accordance with the special processes described herein, and/or in the types of special treating equipment specified herein or currently available for use.

In particular, in instances wherein cationic polymer, weighting agent, and negatively charged anionic flocculating material are employed in the treatment of sewage, the proportions of the two materials used is frequently of importance in determining rapidity and completeness of flocculation, and overall cost of treatment. Again, for best economy of operation, it may be desirable in some treating plants, and in particular in some sewage treating plants, as where the settled solids from the flocculation tanks are dried and burned, to recover at least the iron ore weighting material from the burning step, and recycle at least part of the ferruginous material through the settling process again and again, by means of equipment adapted for such purpose. In such recycling operations, of course, it should be kept in mind that the most generally applicable clarifying agents in the practice of our invention contain from about 1 to about 100 parts of cationic polymer and from about 1 to about 100 parts of iron ore weighting agent, and that in processes wherein negatively charged (anionic) flocculating material is used in addition to cationic clarifying agent comprising cationic polymer and ferruginous material (iron ore weighting agent), the optimum dosage of such negatively charged flocculating material will generally be about equal to the dosage of cationic clarifying agent, but may vary, in some instances, from as little as one hundredth to as much as a hundred times as much. Again, special equipment may often be desirable for the pre-dispersion prior to introduction into the main body of aqueous liquor to be treated, for we have found that our treating agents generally work most efficiently when added in the form of dilute dispersions. In the formulation of these dilute dispersions, we have found that rapid and vigorous agitation of the dry clarifying agent powder in about 30 to 300 times its weight of water gives good results, especially if some heat is applied to the slurry during the mixing step. Thus, in using both cationic clarifying agent and negatively charged flocculating material in the treatment of aqueous liquor (i.e. sewage), it may sometimes be advantageous to use a treating device consisting of a large settling tank fitted with a gentle-agitation device, and two smaller mixing tanks, each of which is fitted with vigorous-agitation devices and perhaps also heaters, said large settling tank and said smaller mixing tanks being connected by valved passageways, and where necessary, pumps. In equipment of this type, the cationic clarifying agent and iron ore weighting agent may be dispersed rapidly in one tank, the negatively charged flocculating material dispersed in the other tank, and the two slurries then added slowly to the larger settling tank in a proportion determined by the valves and/or pumps in the passageways connecting the tanks. In the invention claimed herein, the cationic polymer and the iron ore generally should be mixed dry, and predispersed separately from any anionic flocculating material that may be used; however, it is possible, but generally not as convenient, to disperse the cationic polymer in water in one tank, disperse the iron ore weighting agent separately in another tank, and then mix these two slurries with the sewage, all separately from the dispersion of any anionic flocculating material in the sewage. If the cationic polymer is dispersed in the main body of sewage, and the iron ore is then added, much of the iron ore will simply drop to the bottom of the tank, without becoming enmeshed as an integral part of the floc formed. It is important, in other words, to add the cationic polymer and the iron ore together (either dry or predispersed in water, to the main body of the sewage), and separately from any anionic flocculating material, to obtain to maximum degree the synergistic effects of our invention. In other words, to capitalize on the synergistic effect of the proper type of cationic polymer, as specified herein, and ferruginous material, comprising iron ore weighting agent, in the combination disclosed herein, it is important that these components be mixed, or preferably ground, together prior to addition to the aqueous liquor to be treated. In addition, use of such a pre-mixed combination makes possible economy, ease of control, and ease of handling in plant-scale operations. However, some degree of clarification normally may be effected by mixing these components during admixing of the clarifying material with the aqueous liquor to be treated.

We have found that the order in which various clarifying agents are added may be of importance in some cases, and special equipment of the type described above is well adapted to take advantage of any efficiencies and/or economies of operation which may be realized through appropriate changes in the order and/or method by which our treating chemicals are added to aqueous liquors. Best results are obtained, for example, in the treatment of many sewages (e.g., sanitary sewages, certain raw water supplies) if negatively charged (i.e. anionic) flocculating material is added before the cationic clarifying agent.

The tests of clarification of aqueous liquors (sewages) set forth in the examples below were run in standard Imhoff cones, according to a method adapted from the standard procedure for sewage sedimentation tests set forth in the book, "Standard Methods for the Examination of Water, Sewage, and Industrial Wastes," Tenth Edition, published in 1955 by the American Public Health Association, of New York City (page 272). In each instance, the aqueous liquor to be processed was poured into a standard Imhoff cone having a capacity of 1000 milliliters, the chemical reagent(s) added at the top, the liquor composition stirred for approximately ten seconds with a glass rod 6 millimeters in diameter and 40 centimeters long, and the whole composition then allowed to settle for 7½ to 60 minutes. In instances where the chemical treatment was done in two stages, as in the cases below wherein a "First Stage" and "Second Stage" are specified, the chemicals were added in the "Second Stage," with the same amount of stirring after each stage of treatment, and generally with the elapse of only 30 to 60 seconds between the two stages of chemical treatment. In a few cases where magnetite was included in the ferruginous material, sedimentation was accelerated by placing a powerful permanent magnet under the cone. Novel features and/or modifications of the general processes of our invention where such features are mentioned herein, such as the use of a magnetic field to speed sedimentation, are intended to be included within the scope of the process claims. Since a major reason for employing chemical treating agents is to reduce the size of the treating equipment, settling times of 7½ to 15 minutes have generally been used for the comparison of various treating agents, rather than the more conventional retention periods of 1 to 3 hours. Imhoff cones are shallow, as compared to plant-scale settling equipment, and commercial experience has shown repeatedly that completeness of flocculation, sedimentation, and B.O.D. (Biochemical Oxygen Demand) removal, economy and efficiency of operation, and so forth, are generally enhanced by using treating tanks more than 7 feet deep, recycling at least part of the sludge, and so forth. Accordingly, the results given in the following tables should be interpreted in the light of the conditions of operation, and it would be appreciated that much better results may be expected in plant-scale operations.

The clarity index of the supernatant liquor obtained in our tests after various periods of sedimentation was measured by observing the amount of light, in foot-candles, transmitted through a layer of supernatant liquor 5 inches thick, from a white-light source of constant intensity.

Raw, unsettled aqueous liquor, before chemical or mechanical treatment of any kind, was assigned a "Clarity Index" of 100. The "Clarity Index" of a treated liquor was calculated by dividing the amount of light, in foot-candles (from the white-light source of constant intensity previously described), transmitted through a layer of the treated liquor 5 inches thick, by the amount of light, in foot-candles, transmitted from the same light source through a layer of raw unsettled liquor 5 inches thick under the same conditions, and then multiplying the resultant ratio by 100. For example, if the amount of light transmitted under the standard conditions described was 6 foot-candles in the case of treated liquor and only 4 foot-candles in the case of raw unsettled liquor, the "Clarity Index" of the treated liquor was calculated to be (6/4)×100, or 150. The "B.O.D. Index" (Biochemical Oxygen Demand Index) was calculated in somewhat analogous fashion: the "B.O.D. Index," as set forth in the tables below, refers to a calculated index value obtained by measuring the proportion of biochemical oxygen demand removed from the raw liquor by chemical treatment of the type specified in the table, multiplying this quantity by 100, and finally dividing by the proportion of biochemical oxygen demand removed from the raw unsetled liquor by simple settling over the length of time specified in the table. For example, if the biochemical oxygen demand of supernatant liquor recovered from a given type of chemical treatment of an aqueous liquor, after a given period of settling, was found to be 40 percent lower than that of the raw unsettled aqueous liquor, whereas the supernatant liquor obtained by simple settling of the same type of aqueous liquor was found to have a biochemical oxygen demand only 20 percent below that of the raw unsettled aqueous liquor, the "B.O.D. Index" of the chemically treated aqueous liquor would be calculated to be (40/20)×100, or 200.

The sanitary sewage used in the "FIRST SERIES" of examples below was taken from the municipal sewage system of a small city in the north central part of the about 1,000,000. The ferruginous material employed in the "FIRST SERIES" comprised iron ore and/or ferric chloride, said iron ore consisting of hematite from the Mesabi Iron Range of northern Minnesota, in the United States, and graded so that substantially all of the iron ore passed through an 80-mesh U.S. Standard Screen, but was retained on a 100-mesh U.S. Standard Screen, while the ferric chloride employed was an ordinary grade (so-called "sewage-treatment grade") of ferric chloride. The (anionic) "organic polymer" (flocculating material) specified in the "FIRST SERIES" was a styrene-maleic anhydride copolymer of the type made by the general method set forth in U.S. Patent 2,333,513, and characterized by a molecular weight of about 100,000. The bentonite employed was a Wyoming-type bentonite, primarily in the sodium form, obtained in commercial deposits near Belle Fourche, South Dakota. "Cost of Chemicals per Million Gallons of Sewage Treated," wherever presented in this bulletin, is based on the approximate 1959 costs of materials, f.o.b. St. Paul, Minnesota, U.S.A.: $0.0125 per pound of Wyoming bentonite; $0.01 per pound of Mesabi iron ore; $0.05 per pound of technical-grade ferric chloride; $0.17 per pound of cationic corn starch; and $0.50 per pound of styrene-maleic anhydride copolymer. Only approximate costs are given, since the synergistic effects obtained by interaction of the components in our combinations frequently show a degree of effectiveness at least double—and sometimes ten times or more—that which might be reasonably expected on the basis of the performance of each of the separate ingredients of our combinations. Notice, for instance, in this "FIRST SERIES," that very small amounts of our type of additive, used in accordance with our invention, effects clarification of sewage at a tiny fraction (see Example 2) of the costs involved in admittedly unsuccessful attempts to clarify sewage to roughly the same degree by means of the component chemicals of our compositions, used separately (see Examples 6, 7, 8, 9 and 10), or conventional chemicals conventionally used (Example 7).

FIRST SERIES

*Sanitary Sewage*

| Example No. | Chemical treatment | | | Observed effects of chemical treatment | | | | | Cost of chemicals per million gallons of sewage treated |
|---|---|---|---|---|---|---|---|---|---|
| | Amount of cationic clarifying material used | | Amount of negatively charged flocculating material added (p.p.m.) | After 7½ min. of settling | | After 15 minutes of settling | | | |
| | Cationic starch (p.p.m.) | Ferruginous material (p.p.m.) | | Settled solids (ml.) | Clarity index of supernatant fluid | Settled solids (ml.) | Clarity index of supernatant fluid | B.O.D. Index | |
| 1 | | | | 4.0 | 112 | 6.0 | 122 | 100 | 0.00 |
| 2 | 0.6 | 3 (40/60 iron ore/FeCl₃) | 3 (2000/1 bentonite/org. polymer) | 5.0 | 134 | 8.5 | 138 | | 2.01 |
| 3 | 1.8 | 9 (40/60 iron ore/FeCl₃) | 9 (2000/1 bentonite/org. polymer) | 14.0 | 136 | 13.0 | 140 | | 6.05 |
| 4 | 3.0 | 15 (40/60 iron ore/FeCl₃) | 15 (2000/1 bentonite/org. polymer) | 31.0 | 149 | 33.0 | 149 | 269 | 10.05 |
| 5 | 6.0 | 30 (40/60 iron ore/FeCl₃) | | 25.0 | 136 | 20.0 | 136 | 225 | 17.00 |
| 6 | | 30 (iron ore only) | | 4.0 | 125 | 4.5 | 125 | 143 | 2.50 |
| 7 | | 30 (FeCl₃ only) | | 14.0 | 125 | 15.0 | 128 | 215 | 12.50 |
| 8 | | | 30 (bentonite only) | 3.5 | 123 | 5.0 | 128 | 104 | 3.12 |
| 9 | | | 30 (org. polymer only) | 3.5 | 123 | 4.5 | 125 | 141 | 125.00 |
| 10 | 30 | | | 3.5 | 123 | 5.0 | 126 | 149 | 42.50 |

United States, and contained all of the usual types of household and sanitary wastes, but essentially no industrial wastes. All of the examples (1 to 10 inclusive) of the "FIRST SERIES" involved the use of aliquots of the same batch of municipal sewage, having a chemical composition approximately normal for sanitary sewage in the United States, and being characterized by a pH of 7.6. The cationic starch employed in the "FIRST SERIES" was a cationic modified corn starch having approximately one amino group per 20 anhydroglucose units, and was characterized by a molecular weight of In the case of preferred embodiments of our invention (such as given in Examples 2 to 4 inclusive), the flocs formed on treatment of sanitary sewage are coarse and tough; there is some breaking up of the floc on vigorous stirring, but the floc reforms almost immediately on cessation of agitation, and settles rapidly and well, usually compressing in the sludge form over a period of time. When the sewage composition formed by adding cationic polymer of the type described herein and magnetite iron ore having a particle size smaller than 50 mesh (U.S. Standard Screens) is subjected briefly to a strongmagnetic field, the flocs appear to form far more rapidly, and are coarse and tough, even if the magnetic field is not employed to effect rapid separation of the solids from the aqueous portion.

In the "SECOND SERIES" of examples, tests were conducted according to methods generally similar to those employed in conducting the tests set forth in the "FIRST SERIES" above, except insofar as an industrial (packing-house) waste, containing only a minor component of sanitary (domestic) sewage, obtained in a small city in the north central part of the United States, was employed as aqueous liquor to be treated. The cationic starch, ferruginous material (comprising iron ore except in Example 15), bentonite, and "organic polymer" employed in this series of experiments were the same types as those set forth in the "FIRST SERIES" above, with two exceptions: Examples 15 and 16.

In Example 15, "p-aminobenzyl starch" is specified in the column with the heading "Cationic Starch (p.p.m.)" in the table identified as "SECOND SERIES" (Industrial Waste)" below. In this example, there was used, instead of the amino starch utilized in the "FIRST SERIES," p-aminobenzyl starch, which is a cationic starch of the type described by Pancirolli, Boll, reparto fibre tessili vegetali regia staz sper ind carta e fibre tessili vegetali, 32, 314 (1937). This starch was made by methods adapted from Gaver, U.S. Patent 2,518,135, with the nitro groups of the intermediate p-nitrobenzyl starch being reduced by a method adapted from those set forth by Schriner and Fuson, "The Systematic Identification of Organic Compounds," John Wiley and Sons, Inc., New York, (1945), pages 74 and 75, and Weygand, "Organic Preparations," Interscience Publishers, Inc., New York, (1945), pages 218-222: 4 grams of sodium hydroxide was dissolved in 50 milliliters of ethyl alcohol, and the alcohol-insoluble portion filtered off. 5 grams of corn starch was then added to the alcoholic caustic, and the mixture refluxed at its boiling point for 4 hours with vigorous agitation. The refluxed material was then filtered, the filtered product washed with alcohol, then with ether, dried, and dispersed in 200 milliliters of petroleum ether. 4.8 grams of para-nitrobenzyl chloride was added to this mixture, and the mixture refluxed at its boiling point (ca. 100° C.) for 6 hours. After this heating period, the product (apparently para-nitrobenzyl starch) was filtered off, and dispersed in a mixture of 900 grams of water, 45 grams of copperas ($FeSO_4 \cdot 7H_2O$), and 3.6 grams of sulfuric acid. To this mixture was added a solution of 108 grams of 50 percent aqueous potassium hydroxide and 360 milliliters of 95 percent ethyl alcohol. The whole mass was thoroughly mixed and heated for 5 minutes at 90° C., chilled and concentrated, and the product used as a p-aminobenzyl starch/ferric hydroxide combination, usually in combination with iron ore of fine particle size.

In Example 16, there was used as negatively charged flocculating material, phosphorylated corn starch prepared according to a method adapted from Samec, "Kolloidchemie der Starke," Steinkopff, Leipzig, (1927): 3 grams of corn starch was dispersed in 20 grams of pyridine, and 2.8 grams of phosphorus oxychloride added cautiously and with vigorous stirring. This mass was heated on a hot water bath at 90° C. for 60 minutes with agitation, and the pyridine removed by further heating under vacuum.

SECOND SERIES

*Industrial Waste*

| Example No. | Chemical treatment | | | Observed effects of chemical treatment | | Cost of chemicals per million gallons of sewage treated (dollars) |
|---|---|---|---|---|---|---|
| | Amount of cationic clarifying material added | | Amount of negatively charged flocculating material added (p.p.m.) | After 10 minutes of settling | | |
| | Cationic starch (p.p.m.) | Ferruginous material (p.p.m.) | | Settled solids (ml.) | Clarity index of supernatant fluid | |
| 11 | | | | 2.2 | 110 | 0.00 |
| 12 | 1.2 | 6 (40/60 iron ore/$FeCl_3$) | 6 (2000/1 bentonite/org. polymer) | 36.0 | 150 | 4.02 |
| 13 | 3.0 | 15 (40/60 iron ore/$FeCl_3$) | 15 (2000/1 bentonite/org. polymer) | 40.0 | 155 | 10.07 |
| 14 | 6.0 | 30 (40/60 iron ore/$FeCl_3$) | 30 (2000/1 bentonite/org. polymer) | 70.0 | 160 | 20.14 |
| 15 | 3.6 (p-aminobenzyl starch) | 8 ($Fe(OH)_3$) | 18 (2000/1 bentonite/org. polymer) | 60.0 | 150 | |
| 16 | 3.6 | 6 (40/60 iron ore/$FeCl_3$) | 6 (phosphorylated corn starch) | 33.0 | 140 | |

In the "THIRD SERIES" of examples set forth below, tests on the clarification of two contaminated raw water supplies are set forth. Except where otherwise specified, the cationic starch, ferric chloride, iron ore, organic polymer, and bentonite employed were the same types respectively as were employed in the "FIRST SERIES" of examples set forth above, and the tests of the "THIRD SERIES" were conducted in a fashion generally analogus to that employed in the "FIRST SERIES." The raw "lake water" specified in the following table was drawn from Lake Johanna, a small lake (about 210 acres) in a heavily populated residential area of Ramsey County, Minnesota, and was generally turbid, evidently contaminated by sewage and/or septic-tank effluents draining into the lake from near-by residences. The raw "well water" (for the purposes of this disclosure, "sewage") specified in the following table was drawn from a shallow well only 92 feet deep, situated in the Arden Hills area of Ramsey County, Minnesota, wherein the only available method of disposal of sanitary sewage, at the time of the experiments disclosed herein, involved the use of septic tank and cesspool systems, drain fields, and similar expedients, which tend to lead to some degree of contamination of underlying water-bearing strata. The "cross-linked amino starch" specified in Example 21 was a cationic modified corn starch having approximately one tertiary dimethylamino substituent group per 20 anhydroglucose units, and being cross-linked in the manner described in U.S. Patent 2,500,950 to a molecular weight of several millions. The "hydrogen bentonite" specified in Example 21 was prepared in the following manner: 10 grams of Wyoming-type bentonite, from the Belle Fourche (South Dakota) deposits was dispersed in 510 grams of 0.7 percent aqueous hydrochloric acid, and the resultant dispersion allowed to stand for 336 hours. At the end of this period, 420 grams of clear supernatant liquor was decanted, and the remaining 100 grams comprising the hydrogen bentonite used in the treatment of aqueous liquor. Sizes of iron ore are specified in mesh sizes in Examples 17, 18, 19, and 22—for example, (−48+60) indicates passing through 48 mesh U.S. Standard Screen, and retained on 60-mesh U.S. Standard Screen. (In general, iron ore mesh size in other examples set forth in this disclosure—where not otherwise specified—lay in the range of −60+200 (passing through 60-mesh, and retained on 200-mesh, U.S. Standard Screens)).

equipment. Floc produced in the practice of this invention is coarse and tough, and can be handled without great danger of permanent re-dispersion; moreover, the settled floc gradually compresses down, over a period of time, into a sludge of high solids content, and remarkably low volume content per unit volume of sewage treated. No deleterious effect has yet been observed on the digestion, filtration, or dispersion characteristics of sludges obtained in the practice of our invention. The super-

THIRD SERIES
Raw Water Samples

| Example No. | Raw water supply | Chemical treatment | | Amount of negatively charged flocculating material added (p.p.m.) | Observed effects of chemical treatment |
|---|---|---|---|---|---|
| | | Amount of cationic clarifying material added | | | |
| | | Cationic starch (p.p.m.) | Ferruginous material (p.p.m.) | | |
| 17 | Ramsey County well water. | 12 | 60 (40/60 iron ore (−48+60)/FeCl$_3$). | 30 (2000/1 bentonite/organic polymer). | Slow and incomplete flocculation, much of iron ore dropped to bottom of container before floc formed. |
| 18 | ....do.... | 12 | 60 (40/60 iron ore (−80+100)/FeCl$_3$). | 30 (2000/1 bentonite/organic polymer). | Excellent and complete flocculation, but somewhat slower than in sanitary sewage. Ore apparently helped form floc, and settled as part of floc. |
| 19 | ....do.... | 12 | 60 (40/60 iron ore (−200)/FeCl$_3$). | 30 (2000/1 bentonite/organic polymer). | Characteristic floc formed, but settled very slowly. |
| 20 | ....do.... | 1 [1] | 1 [1] (FeCl$_3$) | 2 [1] (bentonite only). | Slow formation and settling of floc. Noticeably improved visual clarity after 3 hours of standing. |
| 21 | Lake Johanna lake water. | 300 [2] (cross-linked cationic starch). | 3 [2] (Fe(OH)$_3$) | 1000 (hydrogen bentonite). | Clarity index of 110 after 7½ minutes, 124 after 30 minutes, and 126 after 60 minutes. Apparent reduction of content of dissolved mineral solids. |
| 22 | Ramsey County well water. | 3 | 3 (iron ore (−80+100)). | | Slow flocculation, and slight tendency for iron ore to settle out ahead of floc. |
| 23 | ....do.... | 3 | 3 (FeCl$_3$) | | Slow flocculation and settling, but noticeable increase in visual clarity, after 3 hours. |

[1] Added separately to raw water.
[2] Fe(OH)$_3$ was dispersed in the water prior to addition of cross-linked cationic starch.

EXAMPLE 24

After the experiment set forth in Example 16 had been conducted in an Imhoff cone, it was run on a somewhat larger scale, in a 5-gallon jar, with the bubbling of air from the bottom of the jar, up through the sewage containing suspended and/or dissolved organic solids, including the nitrogen-containing cationic starch and the phosphorus-containing phosphorylated starch. Bubbling air through the flocculated mass did not break the floc up seriously, and after the air agitation (aeration/activation) had been stopped, sedimentation was extremely rapid and entirely satisfactory. Result obtained appeared to be generally parallel to those obtained in Example 16. However, there is some evidence that in this type of aeration/activation process, the flocculating agents of our invention actually enhance—perhaps by catalytic and/or nutrient roles—the biological reactions taking place.

As the above examples make amply clear, a remarkable synergistic effect is obtained when cationic starch and ferruginous material are used in combination in the treatment of aqueous liquor, with or without subsequent treatment of the aqueous liquor by negatively charged (anionic) flocculating material. In consequence of this unique and unexpected effect, low concentrations of our chemicals serve for the flocculation and sedimentation of organic as well as inorganic suspended solids in aqueous liquors, generally some dissolved organic solids, and in one embodiment even some dissolved mineral solids. The importance of this synergistic effect is best realized by comparing the chemical cost of treatment, by means of our preferred combinations, with the apparent chemical costs necessary in the case of any one of our ingredients used alone to produce comparable results. Moreover, the amazing speed with which flocculation and sedimentation occur in the practice of our invention in its preferred embodiments, particularly in the treatment of sanitary sewages, makes possible substantial reduction in the size and hence the cost of the treating natant liquor obtained in the practice of preferred embodiments of our invention—even after only 15 minutes of settling in the case of a typical sanitary sewage—frequently has sparkling clarity comparable or even superior to that of many municipal water supplies.

The mechanism underlying the remarkable synergistic effect which forms the basis for our invention is somewhat obscure; however, it is thought that some type of interaction between the ferruginous material (iron ore weighting material) and cationic starch over and above purely ionic interaction may be involved. It seems conceivable, for example, that quasi-covalent bonds or attractive forces may be operative between iron in the ore and the amine and/or hydroxyl groups of the cationic starch.

In most of the examples presented above, the practice of our invention has been illustrated in applications involving sewages and/or industrial wastes containing very substantial concentrations of fecal matter and/or other waste solids. As the examples of the "THIRD SERIES" illustrate, however, certain embodiments of our invention may also be practiced advantageously, in some instances at least, in the purification of aqueous liquors containing much smaller concentrations of fecal matter or other contaminating materials.

Methods of preparing others of the compositions of matter to which we refer above, comprising cationic synthetic organic polyelectrolytes and useful as additives for sewage are set forth in the examples that follow. The amount of any one of these additives most advantageously used in the treatment of a given volume of sewage depends, of course, on the character of the sewage treated.

EXAMPLE 25

2 grams of a polymerized ethylene imine composition (50 percent solids in water) having chiefly secondary amine groups and some primary amine groups and being characterized by an average molecular molecular weight of about 50,000 was dispersed in 100 grams of water, and 3 grams of hematite (iron ore) having an average particle size of about 80 mesh (U.S. Standard Screens) added with vigorous agitation. The resulting mixture was assigned the designation "Reagent A," and was used as an additive for sewage at a concentration of from about 0.1 to about 10 grams but usually about 1.0 gram of Reagent A per 1000 grams of sewage treated.

EXAMPLE 26

2 grams of polymerized ethylene imine composition (50 percent solids in water) having chiefly secondary amine groups and some primary amine groups and being characterized by an average molecular weight of about 50,000 was dispersed in 100 grams of water, and 3 grams of iron oxide containing (pinkish) bauxite type material (aluminum oxide) having an average particle size of about 100 mesh (U.S. Standard Screens) added with vigorous agitation. The resulting mixture was assigned the designation "Reagent B," and was used as an additive for sewage at a concentration of from about 0.1 to about 10 grams, but generally about 1.0 gram of Reagent B per 1000 grams of sewage treated.

EXAMPLE 27

1.5 grams of hematite (iron ore) having an average particle size of about 80 mesh (U.S. Standard Screens) was added, with vigorous agitation, to 50 grams of "Reagent B" prepared as described in Example 26. The resulting mixture was assigned the designation "Reagent C," and was used as an additive for sewage at a concentration of from about 1 to about 10 grams, but usually about 1.0 gram of "Reagent C" per 1000 grams of sewage treated.

Additives for sewage formulated as described in above Examples 25, 26, and 27 may be employed to provide novel sewage compositions from which suspended solids settle or can be removed rapidly in treating mechanisms of simple design and modest size. Generally speaking, we have found addition of from about 1 to about 30 parts of additive solids per million parts of sewage treated to be satisfactory from a cost/performance standpoint in the treatment of most types of sewages. At any rate, preferred embodiments of our invention of novel sewage compositions generally contain from about 1 to about 300 parts by weight of synthetic organic ionic polyelectrolyte per million parts of sewage, and from about 1 to about 300 parts by weight of weighting agent and from about 1 to about 300 parts by weight of water-dispersible inorganic ionic polyelectrolyte. We have also found that in a single-step sewage treating process, the charges on the synthetic organic ionic polyelectrolyte and (if any) water-dispersible inorganic polyelectrolyte in the additive composition employed generally should be similar, whereas in a multi-stage process the charge on the polyelectrolytes employed in successive steps of the process may advantageously be varied—that is, be made either similar or opposite. Again, when sewage is treated with a composition of matter comprising from about 1 to about 100 parts by weight of water-dispersible synthetic organic polyelectrolyte and from about 1 to about 100 parts by weight of weighting material and/or from about 1 to about 100 parts by weight of inorganic polyelectrolyte, it is frequently advantageous also to add to the sewage flocculating material of an electrical charge opposite to that of the water-dispersible synthetic organic polyelectrolyte employed.

In the following table of examples of novel sewage compositions ("FOURTH SERIES"), "Reagent A," Reagent B," and "Reagent C" refer to additives for sewage prepared according to the methods set forth in Examples 25, 26, and 27 above.

"Reagent AA" refers to a composition obtained by mixing together 100 grams of water 3 grams of a commercial grade of ferric chloride having an empirical formula corresponding to $FeCl_3 \cdot 6H_2O$.

"Reagent CC" refers to a composition obtained by mixing together 100 grams of water and 3 grams of a predominantly sodium-base clay of the type commonly known as Wyoming-type bentonite and being a so-called "high-yield" material recovered from the Belle Fourche (South Dakota) deposit of such clay.

The "FOURTH SERIES" (Examples 28 to 36 inclusive) were conducted according to methods generally similar to those employed in conducting the first three "SERIES" of examples, except insofar as a combined sewage, having as its major component industrial (packing-house) waste and having as only a minor component sanitary sewage from a small city in the north central part of the United States, was employed in this "FOURTH SERIES" of examples.

FOURTH SERIES

| Example No. | Chemical treatment | | | | Observed results of chemical treatment | | | | | | B.O.D. Index |
|---|---|---|---|---|---|---|---|---|---|---|---|
| | First stage | | Second stage | | After 7½ minutes of settling | | After 15 minutes of settling | | After 30 minutes of settling | | |
| | Reagent added | Amount of reagent added, gr. | Reagent added | Amount of reagent added, gr. | Settled solids, ml. | Clarity of supernatant fluid | Settled solids, ml. | Clarity of supernatant fluid | Settled solids, ml. | Clarity of supernatant fluid | |
| 28 | (¹) | (¹) | (¹) | (¹) | 2.2 | 120 | 3.0 | 120 | 3.8 | 150 | 100 |
| 29 | AA | 1.0 | | | 3.3 | 120 | 5.0 | 180 | 7.0 | 180 | 3,200 |
| 30 | CC | 1.0 | | | 3.0 | 180 | 5.0 | 200 | 8.5 | 220 | |
| 31 | A | 1.0 | | | 13.0 | 190 | 13.0 | 190 | 13.0 | 200 | |
| 32 | A | 1.0 | CC | 1.0 | 47.0 | 470 | 40.0 | 510 | 32.0 | 750 | 11,000 |
| 33 | B | 1.0 | | | 11.0 | 230 | 13.0 | 260 | 11.0 | 300 | |
| 34 | B | 1.0 | CC | 1.0 | 34.0 | 330 | 31.0 | 370 | 26.0 | 420 | |
| 35 | C | 1.0 | | | 24.0 | 290 | 20.0 | 300 | 17.0 | 330 | |
| 36 | C | 1.0 | CC | 1.0 | 49.0 | 560 | 43.0 | 700 | 32.0 | 790 | |

¹ Raw

It should be emphasized that our invention, as set forth herein, involves the use of cationic polymers and weighting agents in the treatment of sewage, although we have found that some degree of clarification of sewage-type liquors is possible with anionic polymers and weighting agents. Such degree in some cases may provide the basis for an economically feasible method of clarification, particularly if (as suggested above) the anionic polymer is resistant to degradation by heat, oxidation, hydrolysis, bacterial attack, or such like and the anionic polymer/weighting agent combination (optionally) along with inorganic anionic flocculating material (such as bentonite) is employed in some processes such as (1) treating of the sewage-type aqueous liquor with the anionic polymer/weighting agent combination, (2) settling the flocculated solids containing most of the sewage solids, the anionic polymer, and the weighting agent, (3) degrading the sewage solids, but not the anionic polymer or the weighting agent (to any really significant extent), by hydrolysis, oxidation, heat, bacterial attack or such like, in a vessel (preferably) separate from the settling/sedimentation vessel, and (4) recycling the undegraded polymer and weighting agent from the degradation vessel (if such is used) along with make-up chemicals back into the main settling-sedimentation vessel. The anionic polymers of utility in this type of process are generally acidic, containing carboxylic, sulfonic, phosphorus-containing acids, or other acidic groups, or some combination of these classes of acidic groups, have molecular weights in excess of 10,000, are substantially linear, preferably hydrophilic, water-dispersible, and contain at least one acid group per 10,000 units of molecular weight. (Thus, Reagent "H" was prepared by adding 2 grams of activated carbon, having an average particle size smaller than 200 mesh (U.S. Standard Screens) to 100 grams of a mixture obtained by admixing 2 grams of magnetite (iron ore) having an average particle size of about 80 mesh (U.S. Standard Screens) and 100 grams of a dispersion obtained by mixing 3 grams of a predominantly sodium-base montmorillonite clay of the type commonly known as Wyoming-type bentonite and being a so-called "high-yield" material recovered from the Belle Fourche (South Dakota) deposit of such clay, 100 grams of water, and 15 grams of an aqueous dispersion containing 1 percent by weight of the sodium salt of a copolymer of styrene and maleic hydride formed by reaction of equimolar amounts of styrene and maleic anhydride under conditions generally similar to those described in United States Patent 2,333,-513. 1 gram of Reagent "H" so prepared was dispersed in 1000 grams of a raw water from a shallow well only 92 feet deep, situated in a relatively heavily populated part of Ramsey County, Minnesota, wherein the only currently available method of disposal of sanitary sewage involved, at the time of this experiment, the use of septic tank and cesspool systems, drain fields, and similar expedients, all of which tend to lead to some degree of contamination of underlying water-bearing strata. After 1 hour of standing, the supernatant liquor of the treated water ("sewage") was observed visually to have appreciably better clarity than untreated raw water, but it was apparent that this system of treatment did not approach in efficiency the effectiveness of our cationic polymer/weighting agent systems.)

It has been noted above that certain metals or metal compounds, added to or placed in contact with sewage, may act as oxidation catalysts for the solids therein. Such catalysts have proved to be especially effective for the degradation of sewage solids by aeration, in the practice of our invention, although it should be realized that metals and metal compounds generally are regarded as undesirable in the aeration of sewage of such like. (See "Betz Handbook of Industrial Water Conditioning," Third Edition, W. H. & L. D. Betz, Philadelphia 24, Pa., 1950, pages 1 to 6 inclusive; O'Neill, Inst. Sewage Purif., J. Proc. 1957, Pt. 2, 150–2, as abstracted in Chemical Abstracts, 53, 22639g (1959).) It should be noted also that, of the many metals and metal compounds listed as having some utility as catalysts in the treatment of sewage or such like, certain ones are essentially ineffective except on very specific types of sewage solids under very specific conditions, while others of the metals or metal compounds, listed have fairly broad utility as catalysts for the oxidation of solids in, for example, sanitary sewages. We have found copper materials (e.g., soluble copper salts) especially useful as catalysts in the oxidation of municipal sewage: copper materials are effective at very low concentrations, are inherently cheap, and can be removed from the treated sewage (if necessary) by absorption on regenerable ion exchanger (see Kunin and Barry, Industrial and Engineering Chemistry, 41, 1269 (1949) and Kunin and Myers, "Ion Exchange Resins," John Wiley & Sons, Inc., New York, 1950, especially pages 26–37, 128, and 135) or on a disposable ion exchanger such as montmorillonite (see Rolfe, Miller, and McQueen, "Dispersion Characteristics of Montmorillonite, Kaolinite, and Illite Clays in Waters of Varying Quality, and Their Control with Phosphate Dispersants," Geological Survey Professional Paper 334–G, U.S. Department of the Interior, Superintendent of Documents, Washington, 1960, especially pages 233–4), by precipitation, or otherwise. Alternatively, of course, the aeration may be performed on (optionally, porous) beds of particles comprising copper materials, across copper-bearing screens, or such like. Our catalytic method of oxidation is of great interest, of course, in such sewage-treating methods as the Zimmerman process (Bogan, Proc. Am. Soc. Civil Engrs. 85, No. SA4, 13–23 (1959)).

EXAMPLE 37

In this experiment, compounds of various metals were added to 1000-milliliter samples of raw sewage in quantities as indicated in the table below. The samples were aerated for ten minutes by bubbling air through a fritted glass funnel one and one-half inches in diameter from the bottom of the sewage, up through the sewage, while said sewage was contained in a standard Imhoff cone of 1000-milliliter capacity. Then 3 parts of Additive "Q" per million parts of sewage was added to each of the aerated sewage compositions, said Additive "Q" having been dispersed in water, at a solids concentration of 3 percent by weight, approximately 30 minutes prior to addition to the sewage, said Additive "Q" consisting of cationic starch, of the type employed in Example 2 above, Mesabi hematite, and anhydrous ferric chloride, in a cationic starch:hematite:ferric chloride ratio of 1:2:3. Each sewage composition was stirred for a few seconds, and 3 parts of Additive "R" per million parts of sewage next added to each of the sewage compositions, said Additive "R" having been dispersed in water, at a solids concentration of 3 percent by weight, approximately 30 minutes prior to addition to the sewage, said Additive "R" consisting of Belle Fourche bentonite, of the type employed in Example 2 above, and styrene-maleic anhydride copolymer, of the type employed in Example 2 above, in a bentonite:copolymer ratio of 2000:1. The sewage composition was again stirred for a few seconds, and then again aerated for ten minutes by the same method as before. The samples were finally allowed to settle for 15 minutes. A 200 cc. aliquot was removed from the top of each sample and tested for dissolved oxygen by the "Dissolved Oxygen Test," as set forth in "Standard Methods for the Examination of Water, Sewage, and Industrial Wastes," the standard reference already mentioned previously herein. A standard Biochemical Oxygen Demand test was also performed on the samples with the best dissolved oxygen results and on a sample of raw sewage to which no catalyst (metal material) had been added.

| Sample No. | Reagent | Concentration of reagent solids (p.p.m.) | Dissolved oxygen content immediately after 2d aeration (p.p.m.) | Biochemical oxygen demand 5-day (p.p.m.) |
|---|---|---|---|---|
| I | Zinc sulfate | 2.0 | 4.15 | 1,385 |
| II | Manganese sulfate | 2.0 | 0 | |
| III | Chromite | 2.0 | 0 | |
| IV | Copper acetate | 2.0 | 5.1 | 1,205 |
| V | Manganese ore | 2.0 | 0 | |
| VI | Manganous oxide | 2.0 | 0 | |
| VII | Nickel acetate | 0.3 | 0 | |
| VIII | Ammonium molybdate | 0.3 | 0 | |
| IX | Silver nitrate | 0.3 | 0 | |
| X | Zirconium sulfate | 2.0 | 0 | |
| XI | Cobalt sulfate | 0.3 | 2.5 | 1,090 |
| XII | Polymerized ethyleneimine | 2.0 | 0 | |
| XIII | Ilmenite composition | 2.0 | 1.0 | |
| XIV | Raw sewage—no aeration | 0 | 0 | 1,175 |

In the table above, Reagent I denotes a commercial grade of $ZnSO_4 \cdot H_2O$; Reagent II a crude commercial grade of manganese sulfate containing about 65 percent by weight of manganese sulfate, 10 percent by weight of ferrous sulfate, 7 percent by weight of silica, and minor amounts of oxides, sulfates, and phosphates of other elements; Reagent III an air-floated chromite having an average particle size such that 95 percent passed a 325-mesh U.S. Standard Screen, and having a chromium oxide content of about 44 percent by weight, an iron oxide content of about 25 percent by weight, a magnesium oxide content of about 10 percent by weight, a silica content of about 10 percent, the remainder being oxides, silicates, and the like of various other elements, especially aluminum and titanium; Reagent IV an essentially chemically pure grade of copper acetate; Reagent V a crude manganese oxide/silicate ore having a manganese content of about 41 percent, an iron content of about 5 percent, and a particle size of about 100-mesh (U.S. Standard Screens); Reagent VI a crude grade of manganese dioxide having a manganese content of about 48 percent and an average particle size of about 100-mesh (U.S. Standard Screens); Reagent VII a substantially pure grade of nickel acetate; Reagent VIII an essentially pure grade of $(NH_4)_6Mo_7O_{24} \cdot 4H_2O$; Reagent IX an essentially pure form of silver nitrate; Reagent X a commercial grade of $Zr(SO_4)_2 \cdot 4H_2O$; Reagent XI a commercial grade of cobalt sulfate having a cobalt content of about 21 percent by weight; Reagent XII (not a metal compound or metal, but included in this example merely for purposes of comparison) a substantially linear polymer of ethylene imine having an average molecular weight of about 40,000; Reagent XIII an ilmenite composition formed by wetting, with four drops of concentrated sulfuric acid (98 percent), 3 grams of Virginia ilmenite having a titanium dioxide content of about 53 percent by weight (with the remainder being largely iron oxides and silicates) and an average particle size of about 50-mesh (U.S. Standard Screens), permitting the $H_2SO_4$—wetted ilmenite to stand at 70° F. for 4 minutes, and then adding 100 milliliters of water.

As the table above shows, chemically, the catalytic reaction provides a remarkable increase in the dissolved oxygen. Visual observation indicated, however, that the effect of the weighting agent was largely nullified in this example by the aeration after flocculation. Flocculated sewage particles were readily observable in samples taken for a five-day B.O.D. determination; that is, aeration after flocculation tended to make at least some of the flocculated solids to float, and in any commercial practice of this technique (as where substantially insoluble oxidation catalysts were included in the flocculating chemicals), it would be desirable to remove the flocculated solids both by skimming off the top and by draining off the sediment, while clarified water could be removed at some mid-point (vertically) between the floating solids and the settled solids. Of course, soluble oxidation catalysts could be included in the flocculating chemicals, and the aeration delayed until after the flocculation and settling steps.

EXAMPLE 38

12 liters of municipal sewage—designated herein as "38-A-Raw Sewage"—having a high content of industrial packing-house wastes, from a small city in the north central part of the United States was treated with 4.5 parts of Reagent "Q" (see Example 37) solids per million parts of sewage, stirred for a few seconds, and then treated with 4.5 parts of Reagent "R" (see Example 37) solids per million parts of sewage, followed again by stirring, the whole "Q"—"R" treatment in this experiment being conducted under the same general conditions and in a manner parallel to the conditions and manner for the "Q"—"R" treatment of Example 37, except that the vessel employed in this case was a conventional 6 gallon polyethylene waste basket about eighteen inches high. The treated sewage composition (without any aeration of any kind up to this point) was then allowed to settle for 40 minutes, and 8500 cc. of supernatant—designated herein as "38-B-Supernatant from Flocculation"—was siphoned off. 4,000 cc. of 38-B-Supernatant from Flocculation was poured into a vertical cylindrical tube about 3 inches in diameter by five feet high, and compressed air (as tiny bubbles) passed through the sewage in this tube from the bottom of the tube, through a fritted glass funnel about 1½ inches in diameter, for 2½ hours. The treated liquor obtained from this aeration was designated as "38-C-Treated Liquor from Flocculation and Uncatalyzed Aeration."

Another sample of 4,000 cc. of 38-B-Supernatant from Flocculation was poured into a vertical cylindrical tube about 3 inches in diameter by five feet high, and 2 parts of copper acetate per million parts of 38-B-liquor was added, with thorough mixing. Next compressed air (as tiny bubbles) was passed through the sewage in this tube, from the bottom of the tube, through a fritted glass funnel about 1½ inches in diameter, for 2½ hours. The treated liquor obtained from this aeration was designated as "38-D-Treated Liquor from Flocculation and Catalyzed Aeration."

The characteristics of 38-A, 38-B, 38-C, and 38-D are compared in the following table, in which B.O.D. values are set forth, as obtained in the standard 5-day test of biochemical oxygen demand employed by sewage technicians generally.

| Sample | Appearance | Biochemical oxygen demand | |
|---|---|---|---|
| | | P.p.m. | Percent removal |
| 38-A | Dark, dirty gray | 1,055 | |
| 38-B | Turbid gray | 525 | 50.2 |
| 38-C | ..do.. | 440 | 58.3 |
| 38-D | Sparklingly clear; water-white | 265 | 74.9 |

The practice of our invention, as set forth herein, is thus seen to have provided a remarkable increase in the efficiency of sewage treatment, and especially the aeration process. The final effluent obtained in the treatment of the same sewage through a complete secondary biological treating plant averaged a B.O.D. removal of 70.2 percent for the same day on which the above experiments were run. It is seen, therefore, that the process of this invention, using our novel flocculating chemical compositions, followed by properly catalyzed post-aeration of the supernatant, provides a degree of treatment superior to that attained from an operating secondary biological sewage treatment plant.

The literature is replete with references relative to aeration in sewage treatment processes. In the activated sludge processes, the sludge is aerated, and part of it is returned to the primary phase of the treatment process, in part as a method of preventing septicity of the sludge. Pre-aeration of sewage before primary sedimentation is practiced in many operating plants. Pre-aeration and primary sedimentation of sanitary sewage generally produces a reduction of B.O.D. in the range of 45 percent. A small packaged sewage plant provides oxidation and digestion in one unit with extended aeration of the sewage. However no attempt is made in such plants to remove either dissolved or suspended solids as such. The Guggenheim process consists of the aeration of chemically flocculated sewage followed by sedimentation with the return of the sludge to the aeration tank.

To the best of our knowledge, however, the standard literature of the sewage disposal field makes no reference to a process wherein a supernatant of a chemically flocculated sewage, either with or without the addition of a catalyst, is post-aerated.

EXAMPLE 39

In this experiment, seven reagents were employed in a comparison of the flocculating efficiencies for treating a municipal sewage containing high concentrations of industrial (packing-house) wastes from a small city in the north central part of the United States. In each case, 3 parts of reagent solids per million parts of sewage treated was added to 1000 milliliters of sewage in a 1000 cc. Imhoff cone, said reagent solids having been dispersed at a 3 percent solids concentration in water thirty minutes prior to use. After addition of the reagent slurry, the sewage composition was stirred with a glass rod for a few seconds, and then allowed to settle for 15 minutes.

In the case of Reagent 39–A, however, the reagent was added to the sewage, the sewage composition stirred for a few seconds with a glass rod, and then 3 parts of Reagent 39–B solids per million parts of sewage was added, followed by stirring. Reagent 39–A was far more efficient than any of the other reagents tested (at equal concentrations), even if used by itself, and not in association with Reagent 39–B. The efficacy of Reagent 39–A dropped most dramatically and drastically when hematite was omitted from its formulation. (Reagent "Q" contained 80 mesh hematite.)

Reagent 39–A was identical to Reagent "Q" described in Example 37.

Reagent 39–B was identical to Reagent "R" described in Example 37.

Reagent 39–C was a mixture of commercial modified polyacrylamide polymer having a substantial content of carboxylic groups (Chemical Week, September 17, 1960, page 6), pre-dispersed in water over a period of several months at a content of 0.05 percent solids, and magnetite iron ore from the Mesabi range of Minnesota having an average particle size of about 325 mesh (U.S. Standard Screens), the polymer:magnetite ratio of the mixture being 1:2500.

Reagent 39–D was a mixture of a crude substantially linear polyglycolamine having an estimated molecular weight of about 1,000 and regarded as a by-product from the standard commercial process for making alkanolamines from cylic oxides (such as ethylene oxide) and ammonia, and Mesabi magnetite having an average particle size of about 325 mesh (U.S. Standard Screens), the polyglycolamine:magnetite ratio being 1:5.

Reagent 39–E was substantially identical to Reagent "Q" of Example 37, except that a commercial grade of so-called "cationic cellulose" substantially equivalent, for the purposes of this experiment, to the "diethylaminohydroxypropylcellulose" described by Gilles Montegudet (Peintures, pigments, vernis 34, 204–13, 271–9, 311–19 (1958)) was substituted for cationic starch in the formulation.

Reagent 38–F was a mixture of a commercial grade of sodium alginate, characterized by a molecular weight such that a 1 percent solids dispersion of said sodium alginate in water showed a viscosity of 500 centipoises, and finely ground commercial barium sulfate (barite) ore, the alginate:barite ration of the mixture being 1:5 (see Ravnestad, U.S. Patent 1,619,036, issued March 1, 1927).

Reagent 38–G was a mixture of substantially linear polymerized ethylene imine having a molecular weight of about 40,000, and Mesabi magnetite having an average particle size of about 325 mesh (U.S. Standard Screens), the polymer:magnetite ratio of said mixture being 1:5.

| Reagent employed | Volume of settled solids after 15 minutes (c.c.) | Comments |
| --- | --- | --- |
| 39–A, 39–B | 31.0 | Extremely heavy floc; settled rapidly. |
| 39–C | 1.5 | Poor floc; slow settling. |
| 39D | 2.0 | Do. |
| 39–E | | Fair floc; gradual settling. |
| 39–F | 2.5 | Poor floc; slow settling. |
| 39–G | | Fair floc; gradual settling. |
| None | 4.0 | Raw sewage—standard. |

EXAMPLE 40

In this experiment, the whole sewage volume of a small industrial city in the north central part of the United States was treated with compositions of our invention and according to methods of our invention, over a period of almost nine hours. During this period, flow averaged almost 700,000 gallons per hour, and total flow was over 6,000,000 gallons. In this plant, sewage is normally given a "primary" sedimentation treatment, followed by "intermediate" treatment in mechanical flocculating basins stirred slowly by moving paddles, and finished by treatment on biological filters and final clarification basins. Content of B.O.D. (biochemical oxygen demand) of the raw sewage influent during this test averaged 1375 parts per million.

At the primary stage, there was added at a steady rate throughout a nine hour working day through a chemical feeder, as an aqueous dispersion having a solids content of 4 percent, at a rate equivalent to about 25 pounds of solids per hour, an intimate mixture of the proportions: 3 parts anhydrous ferric chloride/2 parts Mesabi hematite of a particle size passing 48 mesh but retained on 60 mesh (U.S. Standard Screens)/1 part cationic starch of the type employed in Example 2 above. Through a second chemical feeder located a few feet downstream from the first feeder at the primary stage, there was added at a steady rate throughout the day, as an aqueous dispersion of 4 percent, at a rate equivalent to about 25 pounds of solids per hour, an intimate mixture of the proportions: 2000 parts Belle Fourche (South Dakota) bentonite/1 part sodium salt of a copolymer of styrene and maleic anhydride formed by reaction of equimolar amounts of styrene and maleic anhydride under conditions generally similar to those described in United States Patent 2,333,513.

In the conventional mode of operation of this plant, expected B.O.D. removal at the intermediate stage averages about 22.4 percent; during the chemical treatment described above B.O.D. removal at the intermediate stage was found to be 41.4 percent.

In the conventional mode of operation of this plant, expected B.O.D. removal at the final stage averages 63.8 percent; during the chemical treatment described above, B.O.D. removal at the final stage was found to be 73.4 percent.

The results obtained in this full field-scale test are especially noteworthy since the particular sewage used in this case had a very high content of industrial (packing-house) waste, and an average B.O.D. content about 400 percent greater than the average B.O.D. content of ordinary sanitary sewages. Again, the results are noteworthy for the extremely low costs involved; at 1959 costs (f.o.b. St. Paul, Minnesota), the total costs of chemicals for this treatment was only about $2.60 per million gallons treated, a figure approximately the same as the cost of electricity to pump thiis same sewage through the various stages of the complete plant operation.

From the foregoing, the compositions of matter and processes of our invention it will be readily understood. Numerous modifications and changes will readily occur to those skilled in the art after a consideration of the foregoing specification and accompanying claims. Examples of such modifications would include, but in no way be limited to: a method of recirculation of sludge chemically activated with compositions of our disclosure; a method of removing the floc formed by the use of our compositions on mesh screening or other similar filter media from the aqueous liquor; a method of separating the flocs formed by our compositions containing magnetically active components by the utilization of either permanent or electromagnetic devices capable of exerting a magnetic field; additionally, the methods of aerating, either with or without a catalyst, the aqueous liquor treated with the compositions of our disclosure; and equipment adapted for utilizing these methods.

It is not desired to limit the invention to the exact compositions and processes described, but rather we intend to include in the scope of our claims such minor modifications or substantial equivalents as may occur to one versed in the art and provided with the benefit of our disclosure. In particular, we do not intend in any way to limit the breadth of our invention by the speculations above concerning possible mechanisms which might be useful in explaining the remarkable synergistic effects actually observed.

We claim:

1. A process for separating solids from sewage, in which there are admixed with said sewage iron ore weighting agent having a specific gravity in excess of 1 and having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

2. A process for separating solids from sewage, in which there are admixed with said sewage separately (a) iron ore weighting agent having a specific gravity in excess of 1 and having a particle size smaller than 50 mesh (U.S. Standard Screens) and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and (b) anionic flocculating material, and in which, after said flocculation and accelerated sedimentation of solids, there is separated from the sewage composition formed an aqueous portion substantially free of suspended solids.

3. A process for separating solids from sewage, in which there are admixed with said sewage iron ore weighting agent having a specific gravity in excess of 1 and having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed, and subjected to aeration in the presence of oxidation catalyst, an aqueous portion substantially free of suspended solids.

4. A process for separating solids from sewage, in which there are admixed with said sewage separately (a) iron ore weighting agent having a specific gravity in excess of 1 and having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and (b) anionic flocculating material, and in which, after said flocculation and accelerated sedimentation of solids, there is separated from the sewage composition formed, and subjected to aeration in the presence of oxidation catalyst, an aqueous portion substantially free of suspended solids.

5. A process for separating solids from sewage, in which there are admixed with said sewage hematite iron ore weighting agent having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqeuous portion substantially free of suspended solids.

6. A process for separating solids from sewage, in which there are admixed with said sewage magnetite iron ore weighting agent having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

7. A magnetic process for separating solids from sewage, in which there are admixed with said sewage iron ore weighting agent having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated separation of solids in an artificially imposed magnetic field, and in which, after said flocculation and accelerated separation of solids in said artificially imposed magnetic field, there is separated from the sewage composition formed an aqueous portion substantially free of suspended solids.

References Cited in the file of this patent

UNITED STATES PATENTS

| 1,619,036 | Ravnestad | Mar. 1, 1927 |
| 2,867,584 | Scott | Jan. 6, 1959 |
| 2,919,898 | Marwil et al. | Jan. 5, 1960 |
| 2,937,143 | Foren | May 17, 1960 |

FOREIGN PATENTS

| 860 | Great Britain | of 1877 |

OTHER REFERENCES

Dow: "Separan 2610 in Waste and Sewage Treatment," October 1956, pages 10–15 relied on.